United States Patent
Chang et al.

(10) Patent No.: US 12,413,510 B2
(45) Date of Patent: Sep. 9, 2025

(54) METHOD AND APPARATUS FOR PACKET FORWARDING, NETWORK NODE AND STORAGE MEDIUM

(71) Applicant: New H3C Technologies Co., Ltd., Hangzhou (CN)

(72) Inventors: Xiangqing Chang, Beijing (CN); Zhaoyan Lei, Beijing (CN); Tao Lin, Beijing (CN); Juan Qin, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 11 days.

(21) Appl. No.: 18/001,943

(22) PCT Filed: Jun. 29, 2021

(86) PCT No.: PCT/CN2021/103176
§ 371 (c)(1),
(2) Date: Dec. 15, 2022

(87) PCT Pub. No.: WO2023/272498
PCT Pub. Date: Jan. 5, 2023

(65) Prior Publication Data
US 2024/0106740 A1    Mar. 28, 2024

(51) Int. Cl.
*H04L 45/00* (2022.01)
*H04L 9/40* (2022.01)
*H04L 69/22* (2022.01)

(52) U.S. Cl.
CPC ............ *H04L 45/34* (2013.01); *H04L 63/08* (2013.01); *H04L 63/123* (2013.01); *H04L 69/22* (2013.01)

(58) Field of Classification Search
CPC ....... H04L 45/34; H04L 63/08; H04L 63/123; H04L 69/22
See application file for complete search history.

(56) References Cited

U.S. PATENT DOCUMENTS 12,245,130 B2 * 3/2025 Grewal .............. H04W 40/248
2019/0306056 A1 * 10/2019 Jeuk ........................ H04L 45/74
(Continued)

FOREIGN PATENT DOCUMENTS

| CN | 109688057 | 4/2019 |
| CN | 111181852 | 5/2020 |

(Continued)

OTHER PUBLICATIONS

Extended European Search Report issued in corresponding European Application No. 21944452.8, dated Aug. 1, 2023.
(Continued)

*Primary Examiner* — Blake J Rubin
(74) *Attorney, Agent, or Firm* — NORTON ROSE FULBRIGHT US LLP

(57) ABSTRACT

Method and apparatus for packet forwarding, which relate to the network technology field and are applied to a network node. The method comprises: obtaining an SRV6 packet; if a function field in a target SID contains a security authentication instruction, obtaining a target argument based on an operation indicated by the security authentication instruction, and performing security authentication processing on the SRv6 packet based on the target argument; wherein, the target SID is an SID, corresponding to the network node, in a segment list carried by a header of the SRv6 packet, and the target argument is: an argument for the security authentication instruction recorded in the header; and forwarding the processed SRv6 packet to a next-hop device. By applying the solution for packet forwarding according to examples of the present disclosure, the security in forwarding the SRv6 packet along the SRv6 forwarding path can be improved.

10 Claims, 3 Drawing Sheets

(56) References Cited

U.S. PATENT DOCUMENTS

| | | | | |
|---|---|---|---|---|
| 2019/0394211 A1* | 12/2019 | Filsfils | ............... | H04L 45/7453 |
| 2020/0389391 A1 | 12/2020 | Li et al. | | |
| 2021/0243107 A1* | 8/2021 | Retana | ................... | H04L 45/04 |
| 2021/0352009 A1* | 11/2021 | Van de Velde | ......... | H04L 69/22 |
| 2023/0044321 A1* | 2/2023 | Lu | ........................... | H04L 63/20 |
| 2023/0091393 A1* | 3/2023 | Kushalad | ............... | H04L 45/74 |
| | | | | 370/255 |
| 2023/0102984 A1* | 3/2023 | Lu | ....................... | H04L 63/029 |
| | | | | 726/11 |
| 2023/0283588 A1* | 9/2023 | Xu | ....................... | H04L 63/123 |
| | | | | 709/245 |
| 2023/0300065 A1* | 9/2023 | Dong | ..................... | H04L 45/04 |
| | | | | 370/389 |

FOREIGN PATENT DOCUMENTS

| | | |
|---|---|---|
| CN | 111510387 | 8/2020 |
| CN | 111585890 | 8/2020 |
| CN | 112189323 | 1/2021 |
| CN | 112532575 | 3/2021 |
| CN | 112804148 | 5/2021 |
| JP | 2015515210 | 5/2015 |
| WO | WO 2021/021172 | 2/2021 |
| WO | WO 2021068641 | 4/2021 |

OTHER PUBLICATIONS

Previdi et al., "IPv6 Segment routing header (SRH); draft-ietf-6man-segment-routing-header-06. Txt", *Internet Engineering Task Force*, Mar. 2017, pp. 1-35.

Filsfils, Clarence, et al. "IPv6 Segment Routing Header (SRH)." *Internet Engineering Task Force*, Oct. 22, 2018, https://datatracker.ietf.org/doc/html/draft-ietf-6man-segment-q-header-15.

Office Action issued in corresponding Japanese Application No. 2022-578739, dated Feb. 6, 2024.

Office Action issued in corresponding Chinese Application No. 202180001694.9, dated Dec. 31, 2024.

* cited by examiner

METHOD AND APPARATUS FOR PACKET FORWARDING, NETWORK NODE AND STORAGE MEDIUM

CROSS-REFERENCE TO RELATED APPLICATIONS

The present application is a national phase under 35 U.S.C. § 371 of International Application No. PCT/CN2021/103176, filed Jun. 29, 2021, which is incorporated herein by reference in its entirety.

TECHNICAL FIELD

The present disclosure relates to the technical field of network technology, and in particular, to a method and apparatus for packet forwarding, a network node and a storage medium.

BACKGROUND

The Segment Routing IPv6 (SRv6) technology is a source routing technology. The SRv6 technology supports that an originating network node in an SRv6 forwarding path inserts segmentation information for the SRv6 forwarding path in a packet. For convenience of description, the packet in which the segmentation information has been inserted is referred to an SRv6 packet. The segmentation information for the SRv6 forwarding path indicates a sequence of packet forwarding performed by all network nodes included in the SRv6 forwarding path. In this way, other network nodes, after receiving the SRv6 packet, can forward the packet based on the segmentation information carried in the SRv6 packet.

However, there may be an unreliable network node(s) or an unreliable link(s) in the SRv6 forwarding path, which results in a problem of poor security when the SRv6 packet is forwarded along the SRv6 forwarding path.

SUMMARY

The object of the present disclosure is to provide a method and an apparatus for packet forwarding, so as to improve the security in forwarding the SRv6 packet. Specific solutions are as follows.

In a first aspect, an example of the present disclosure provides a method for packet forwarding, which is applied to a network node, comprising:
  obtaining an SRv6 packet;
  if a function field in a target segment identifier SID contains a security authentication instruction, obtaining a target argument based on an operation indicated by the security authentication instruction, and performing security authentication processing on the SRv6 packet based on the target argument; wherein, the target SID is an SID, corresponding to the network node, in a segment list carried by a header of the SRv6 packet, and the target argument is an argument for the security authentication instruction recorded in the header; and
  forwarding the processed SRv6 packet to a next-hop device.

In an example of the present disclosure, the SRv6 packet is generated by an originating network node for the SRv6 packet through operations of;
  receiving an initial packet;
  if it is determined that an unsecured network node exists in an SRv6 forwarding path for forwarding the initial packet, obtaining the argument for the security authentication instruction, wherein, the security authentication instruction indicates that the unsecured network node performs the security authentication processing on the SRv6 packet;
  determining whether a data amount of the argument for the security authentication instruction is greater than a maximum data amount of an arguments field in the SID;
  if the data amount of the argument for the security authentication instruction is greater than the maximum data amount of the arguments field in the SID, generating the SID having the function field that contains the security authentication instruction and the arguments field that contains a first argument for the unsecured network node, and generating the SRv6 packet based on the initial packet, wherein, an extension field in the header of the SRv6 packet contains a second argument, the security authentication instruction further indicates that the argument for the security authentication instruction is stored in the arguments field and the extension field in the header, the first argument is a part of the argument for the security authentication instruction with a data amount smaller than or equal to the maximum data amount, and the second argument is the other part of the argument for the security authentication instruction except for the first argument; and
  if the data amount of the argument for the security authentication instruction is not greater than the maximum data amount of the arguments field in the SID, generating the SID having the function field that contains the security authentication instruction and the arguments field that contains the argument for the security authentication instruction for the unsecured network node, and generating the SRv6 packet based on the initial packet, wherein, the security authentication instruction further indicates that the argument for the security authentication instruction is stored in the arguments field.

In an example of the present disclosure, obtaining the target argument based on the operation indicated by the security authentication instruction comprises:
  obtaining the target argument from the argument contained in the arguments field in the target SID, if the security authentication instruction indicates that the argument for the security authentication instruction is stored in the arguments field; and
  obtaining the target argument from the argument contained in the arguments field in the target SID and the argument contained in the extension field in the header, if the security authentication instruction indicates that the argument for the security authentication instruction is stored in the arguments field and the extension field in the header.

In an example of the present disclosure, the security authentication instruction comprises an encapsulation instruction for encapsulating a payload of the SRv6 packet; and
  performing the security authentication processing on the SRv6 packet based on the target argument comprises:
    encapsulating the payload of the SRv6 packet based on the target argument.

In an example of the present disclosure, the security authentication instruction comprises a decapsulation instruction for decapsulating the payload of the SRv6 packet; and
  performing the security authentication processing on the SRv6 packet based on the target argument comprises:

decapsulating the payload of the SRv6 packet based on the target argument.

In a second aspect, an example of the present disclosure provides an apparatus for packet forwarding, which is applied to a network node, the apparatus comprises:

a packet obtaining module to obtain an SRv6 packet;

a security processing module to, if a function field in a target segment identifier SID contains a security authentication instruction, obtain a target argument based on an operation indicated by the security authentication instruction, and perform security authentication processing on the SRv6 packet based on the target argument; wherein, the target SID is an SID, corresponding to the network node, in a segment list carried by a header of the SRv6 packet, and the target argument is an argument for the security authentication instruction recorded in the header; and a packet forwarding module to forward the processed SRv6 packet to a next-hop device.

In an example of the present disclosure, the SRv6 packet is generated by an originating network node for the SRv6 packet through operations of:

receiving an initial packet;

if it is determined that an unsecured network node exists in an SRv6 forwarding path for forwarding the initial packet, obtaining the argument for the security authentication instruction, wherein, the security authentication instruction indicates that the unsecured network node performs the security authentication processing on the SRv6 packet;

determining whether a data amount of the argument for the security authentication instruction is greater than a maximum data amount of an arguments field in the SID;

if the data amount of the argument for the security authentication instruction is greater than the maximum data amount of the arguments field in the SID, generating the SID having the function field that contains the security authentication instruction and the arguments field that contains a first argument for the unsecured network node, and generating the SRv6 packet based on the initial packet, wherein, an extension field in the header of the SRv6 packet contains a second argument, the security authentication instruction further indicates that the argument for the security authentication instruction is stored in the arguments field and the extension field in the header, the first argument is a part of the argument for the security authentication instruction with a data amount smaller than or equal to the maximum data amount, and the second argument is the other part of the argument for the security authentication instruction except for the first argument; and if the data amount of the argument for the security authentication instruction is not greater than the maximum data amount of the arguments field in the SID, generating the SID having the function field that contains the security authentication instruction and the arguments field that contains the argument for the security authentication instruction for the unsecured network node, and generating the SRv6 packet based on the initial packet, wherein, the security authentication instruction further indicates that the argument for the security authentication instruction is stored in the arguments field.

In an example of the present disclosure, the security processing module is further to:

obtain the target argument from the argument contained in the arguments field in the target SID, if the function field in the target SID contains the security authentication instruction, and the security authentication instruction indicates that the argument for the security authentication instruction is stored in the arguments field;

obtain the target argument from the argument contained in the arguments field in the target SID and the argument contained in the extension field in the header, if the function field in the target SID contains the security authentication instruction, and the security authentication instruction indicates that the argument for the security authentication instruction is stored in the arguments field and the extension field in the header; and perform the security authentication processing on the SRv6 packet based on the target argument.

In an example of the present disclosure, the security authentication instruction comprises an encapsulation instruction for encapsulating a payload of the SRv6 packet; and the security processing module is further to:

obtain the target argument based on the operation indicated by the security authentication instruction if the function field in the target SID contains the security authentication instruction; and encapsulate the payload of the SRv6 packet based on the target argument.

In an example of the present disclosure, the security authentication instruction comprises a decapsulation instruction for decapsulating the payload of the SRv6 packet;

the security processing module is further to:

obtain the target argument based on the operation indicated by the security authentication instruction if the function field in the target SID contains the security authentication instruction; and decapsulate the payload of the SRv6 packet based on the target argument.

In a third aspect, an example of the present disclosure provides a network node, comprising a processor and a machine-readable storage medium, wherein the machine-readable storage medium has stored thereon machine executable instructions that, upon executed by the processor, cause the processor to carry out any one of the methods in the first aspect.

In a fourth aspect, an example of the present disclosure proves a machine-readable storage medium having stored thereon machine executable instructions that, upon called and executed by a processor, cause the processor to carry out any one of the methods in the first aspect.

The present disclosure brings the following advantage effects:

By applying the solution of the example of the present disclosure, after obtaining the SRv6 packet, the network node obtains a target argument based on an operation indicated by a security authentication instruction and performs a security authentication processing on the SRv6 packet based on the target argument, if a function field in the target SID corresponding to the network node contains the security authentication instruction, and then forwards the processed SRv6 packet to a next-hop device in the SRv6 forwarding path.

It can be seen that, in the case that the function field in the target SID corresponding to the network node contains the security authentication instruction, the network node does not directly forward the SRv6 packet, but the network node forwards, after performing security authentication processing indicated by the security authentication instruction on the SRV6 packet based on the target argument, the SRv6 packet on which the security authentication processing has been performed. Since the security of the SRv6 packet can be improved by performing, by the network node, the security authentication processing indicated by the security authentication instruction on the SRv6 packet, thus the security in forwarding the SRv6 packet can be improved by applying, by the network node, the technical solution of the example of the present disclosure to forward the SRv6 packet on which the security authentication processing has been performed.

BRIEF DESCRIPTION OF THE DRAWINGS

In order to more clearly describe the technical solutions of the examples of the present disclosure or of the prior art, drawings that need to be used in examples and the prior art will be briefly described below. Obviously, the drawings provided below are for only some examples of the present disclosure; those skilled in the art can also obtain other drawings based on these drawings.

DETAILED DESCRIPTION

In order to make the objectives, technical solutions, and advantages of the present disclosure clearer and more understandable, the present disclosure will be described in more detail below with reference to the appended drawings and examples. Obviously, the described examples are only some, and not all, of the examples of the present disclosure. All other examples obtained based on the examples of the present disclosure by those skilled in the art fall into the scope of protection defined by the present disclosure.

In the prior art, if an SRv6 forwarding path includes an unreliable network node(s) or an unreliable link(s), a technical problem of poor security exists in forwarding an SRv6 packet along the SRv6 forwarding path. In order to solve this problem, examples of the present disclosure provide a method and an apparatus for packet forwarding, a network node and a storage medium.

An example of the present disclosure provides a method for packet forwarding, which is applied to a network node, comprising:

obtaining an SRv6 packet;

if a function field in a target segment identifier SID contains a security authentication instruction, obtaining a target argument based on an operation indicated by the security authentication instruction, and performing security authentication processing on the SRv6 packet based on the target argument; wherein, the target SID is an SID, corresponding to the network node, in a segment list carried by a header of the SRv6 packet, and the target argument is an argument for the security authentication instruction recorded in the header; and forwarding the processed SRv6 packet to a next-hop device.

It can be seen that, in the case that the function field in the target SID corresponding to the network node contains the security authentication instruction, the network node does not directly forward the SRv6 packet, but the network node forwards, after performing security authentication processing indicated by the security authentication instruction on the SRv6 packet based on the target argument, the SRv6 packet on which the security authentication processing has been performed. Since the security of the SRv6 packet can be improved by performing, by the network node, the security authentication processing indicated by the security authentication instruction on the SRv6 packet, thus the security in forwarding the SRv6 packet can be improved by applying, by the network node, the technical solution of the example of the present disclosure to forward the SRv6 packet on which the security authentication processing has been performed.

The method for packet forwarding according to the example of the present disclosure will be described below with reference to FIG. 1 and FIG. 2.

Figure 1:
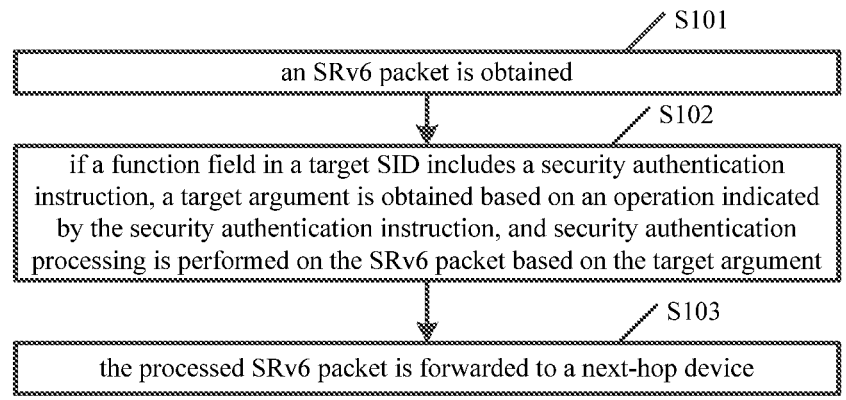
FIG. 1 is a flowchart of a first method for packet forwarding according to an example of the present disclosure.

FIG. 1 is a flowchart of a first method for packet forwarding according to an example of the present disclosure, which is applied to a network node.

The network node may be a router, a switch and so on.

Figure 2:
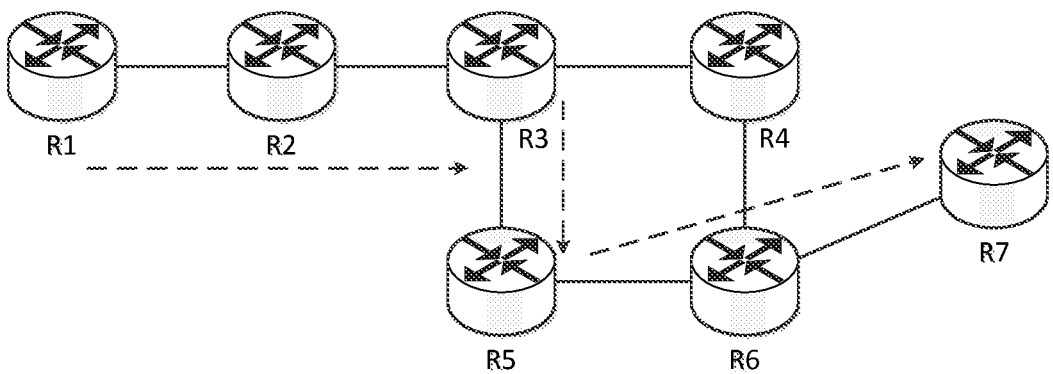
FIG. 2 is a diagram of an SRv6 forwarding path according to an example of the present disclosure.

FIG. 2 is a diagram of an SRv6 forwarding path according to an example of the present disclosure.

As shown in FIG. 2, a network includes network nodes R1-R7. A solid connection line between network nodes indicates that the network nodes at both sides of the solid connection line are intercommunicated, and a dashed arrow in FIG. 2 indicates an SRv6 forwarding path.

Specifically, an SRv6 forwarding path shown in FIG. 2 is R1 R2 R3 R5 R6 R7.

For example, R1-R3 may be referred to a first path segment, R3-R5 may be referred to a second path segment, and R5-R7 may be referred to a third path segment.

The solution of the example of the present disclosure may be executed by any network node except for the originating network node in the SRv6 forwarding path. On this basis, the solution of the example of the present disclosure may be executed by each of network nodes R2-R7 except for the originating network node R1 in the SRv6 forwarding path as shown in FIG. 2.

The method for packet forwarding may include blocks S101-S103.

At block S101, an SRv6 packet is obtained.

Specifically, the SRv6 packet obtained by the network node may be an SRv6 packet forwarded by a network node located before and adjacent to the network node. For example, the SRv6 packet obtained by the network node R3 may be an SRv6 packet forwarded by the network node R2.

The SRv6 packet includes a header and a payload. The header is a Segment Identifier Header (SRH).

Specifically, the header of the SRv6 packet includes a segment list. The segment list includes SIDs corresponding to network nodes in the SRv6 path except for the originating network node, wherein the SIDs corresponding to the network nodes in the segment list are in the reverse order of the network nodes in the SRv6 forwarding path.

The SID includes Locator (locator field), Function (function field), and Arguments (arguments field).

The Locator is used for indicating the location of a network node corresponding to the SID in the SRv6 forwarding path, and the Locator includes a Locator Block (locator block field) and a Locator Node (locator node field).

The Function includes a packet processing instruction which is to be performed by the network node corresponding to the SID on the SRv6 packet. Specifically, the Function may include one or more packet processing instruction.

The Arguments includes an argument(s) for the packet processing instruction.

Further, the header of the SRv6 packet further includes other fields than the segment list. The other fields include information which is same as that in the prior arts, which is not repeated in the example of the present disclosure.

Further, the payload is a field except for the header in the SRv6 packet, and containing data transmitted by the SRv6 packet.

In an example of the present disclosure, the header further includes a number field for recording a number of the SID corresponding to the network node, and the number field may be denoted by SL (Segments Left).

At block S102, if a function field in a target SID includes a security authentication instruction, a target argument is obtained based on an operation indicated by the security authentication instruction, and security authentication processing is performed on the SRv6 packet based on the target argument.

The target SID is an SID, corresponding to the network node, in a segment list carried by a header of the SRv6 packet, and the target argument is an argument for the security authentication instruction recorded in the header.

Specifically, an SID with the number in the segment list, which is a number recorded in the number field, is determined as the target SID.

In an example of the present disclosure, the target argument may be obtained from the location indicated by the security authentication instruction in the header, which is specifically shown in steps S102A-S102B, and not repeated herein.

Further, the security authentication instruction may be an encapsulating instruction for encapsulating the payload of the SRv6 packet, or may be a decapsulating instruction for decapsulating the payload of the SRv6 packet.

Specifically, the security authentication instruction may be an instruction for instructing the network node to perform security authentication processing on the SRv6 packet based on Internet Protocol Security (IPsec) and/or Hash-based Packet Authentication Code (HMAC).

The IPsec is composed of three sections, i.e., Authentication Header (AH), Encapsulating Security Payload (ESP) and Secure Association (SA).

The AH may provide functions such as data integrity check, data source identification and anti-replay attack protection for the SRv6 packet. The ESP may provide functions such as data encryption, data source identification, data integrity check and anti-replay attack protection for the SRv6 packet. The SA is used for creating an unidirectional security relationship for network nodes at both ends of communication and assigning information such as algorithms and arguments needed by the IPsec.

Specifically, the SA may be created via the Internet Key Exchange (IKE) protocol, or may be created in other manners. The security authentication processing may be performed on the SRv6 packet by the AH or the ESP, or by both of the AH and the ESP, during the process of performing the security authentication processing on the SRv6 packet.

The IPsec is known in the prior art, which is not repeatedly in the example of the present disclosure.

In an example of the present disclosure, in case where the security authentication instruction includes the encapsulating instruction, the security authentication processing is performed on the SRv6 packet through step A as described below, which is not described in detail here.

In another example of the present disclosure, in case where the security authentication instruction includes the decapsulating instruction, the security authentication processing is performed on the SRv6 packet through step B as described below, which is not described in detail here.

At block S103, the processed SRv6 packet is forwarded to a next-hop device.

The next-hop device is a network node located after and adjacent to the network node in the SRv6 forwarding path.

For example, referring to FIG. 2, the network node R5 is the next-hop device for the network node R3, in the SRv6 forwarding path.

In an example of the present disclosure, the number recorded in the number field of the header may be reduced by one to obtain the number of the SID corresponding to the next-hop device in the SRv6 forwarding path, so as to determine the SID corresponding to the next-hop device in the SRv6 forwarding path in the segment list. The destination address of the SRv6 packet is updated to the SID corresponding to the next-hop device in the SRv6 forwarding path, and the SRv6 packet whose the destination address has been changed is forwarded according to a routing table recorded by the network node.

Specifically, the network node may distribute the SRv6 packet on which the security authentication processing has been performed to the network based on Interior Gateway Protocols (IGP).

It can be seen that, in the case that the function field in the target SID corresponding to the network node includes the security authentication instruction, the network node does not directly forward the SRv6 packet, but the network node forwards, after performing security authentication processing indicated by the security authentication instruction on the SRv6 packet based on the target argument, the SRv6 packet on which the security authentication processing has been performed. Since the security of the SRv6 packet can be improved by performing, by the network node, the security authentication processing instructed by the security authentication instruction on the SRv6 packet, thus the security in forwarding the SRv6 packet can be improved by applying, by the network node, the technical solution of the example of the present disclosure to forward the SRv6 packet on which the security authentication processing has been performed.

Further, the network nodes except for the originating network node in the SRv6 forwarding path may perform security authentication processing on the SRv6 packet, as shown in the example of FIG. 1. If the originating network node determines that it is an unsecured network node, it can directly perform security authentication processing on the payload of the initial packet, then generate and forward the SRv6 packet.

Specifically, since the originating network node is a start network node in the SRv6 forwarding path, there is no a network node located before the originating network node that encapsulates the payload of the packet in the SRv6 forwarding path, and thus the originating network node often performs the encapsulation as the security authentication processing, and the other network nodes in the SRv6 forwarding path perform the decapsulation subsequently.

In an example of the present disclosure, the security authentication processing is performed on the SRv6 packet through step A.

At step A, the payload of the SRv6 packet is encapsulated based on the target argument.

Specifically, the payload is encapsulated based on the IPsec protocol and/or HMAC. In the process of encapsulating the payload via the IPsec protocol, only the AH may be used to encapsulate the payload, or only the ESP may be used to encapsulate the payload, or the AH and the ESP may be jointly used to encapsulate the payload.

Figure 3:
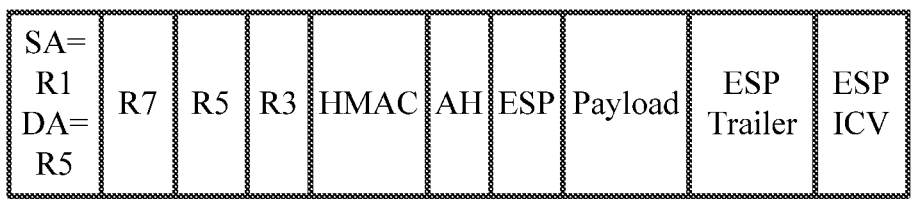
FIG. 3 is a diagram of an encapsulated SRv6 packet according to an example of the present disclosure.

FIG. 3 is a diagram of an encapsulated SRv6 packet according to an example of the present disclosure.

Corresponding to the FIG. 2, FIG. 3 illustrates the SRv6 packet obtained after encapsulating the payload of the SRv6 packet by the network node R3. Each rectangle in FIG. 3 represents one field in the encapsulated SRv6 packet.

SA (Source Address)=R1 indicates that the source address of the SRv6 packet is the address of the network node R1, DA (Destination or Target Address)=R5 indicates that the destination address to which the SRv6 packet is to be forwarded based on the SRv6 forwarding path is the address of the network node R5.

R7 field, R5 field and R3 field indicate that path segments included in the SRv6 forwarding path are R1-R3, R3-R5, R5-R7, respectively.

HMAC field, AH field and ESP field are fields added to the SRv6 packet after encapsulating, by R3, the payload by jointly using the HMAC, the AH and the ESP. The ESP trailer field is an ESP trailer field corresponding to the ESP field, and the ESP ICV (Integrity Check Value) field is an argument(s) required for packet authentication.

Further, FIG. 3 is a diagram of the encapsulated SRv6 packet. The encapsulated SRv6 packet actually further includes other fields in addition to fields shown in FIG. 3.

In another example of the present disclosure, the security authentication processing is performed on the SRv6 packet through step B.

At step B, the payload of the SRv6 packet is decapsulated based on the target argument.

Specifically, if the payload included in the SRv6 packet has been encapsulated, then it is necessary to decapsulate the payload by a decapsulation manner corresponding to the encapsulation manner used in the encapsulation.

Figure 4:
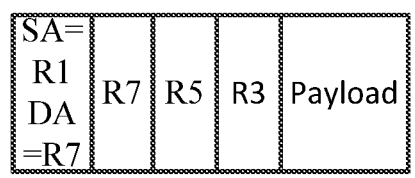
FIG. 4 is a diagram of a decapsulated SRv6 packet according to an example of the present disclosure.

FIG. 4 is a diagram of a decapsulated SRv6 packet according to an example of the present disclosure.

The decapsulation may be performed by the network node R5 in FIG. 2. Compared with the example in FIG. 3, the HMAC field, the AH field, the ESP field, the ESP trailer field and the ESP ICV field are removed after decapsulation. Further, based on the SRv6 forwarding path, the packet forwarded by the network node R5 needs to be forwarded to the network node R7, therefore the DA recorded in the decapsulated SRv6 packet is the address of the network node R7.

Further, FIG. 4 is a diagram of the decapsulated SRv6 packet. The decapsulated SRv6 packet actually further includes other fields in addition to fields shown in FIG. 4.

In an example of the present disclosure, the SRv6 packet may be generated by the originating network node for the SRv6 packet, and the originating network node may be the start network node in the SRv6 forwarding path.

For example, referring to FIG. 2, the originating network node may be the network node R1.

Figure 5:
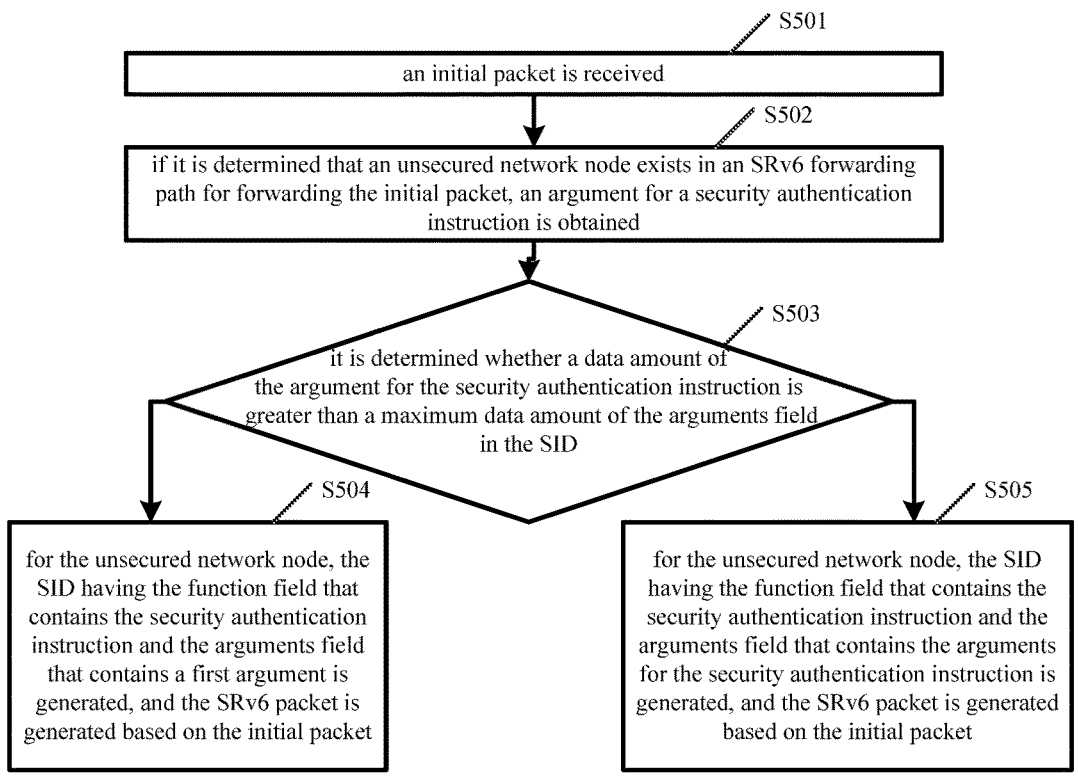
FIG. 5 is a flowchart of a method for generating an SRv6 packet according to an example of the present disclosure.

FIG. 5 is a flowchart of a method for generating an SRv6 packet according to an example of the present disclosure. The originating network node may generate the SRv6 packet through blocks S501-505.

At block S501, an initial packet is received.

Specifically, the initial packet may include a payload and a header of the initial packet.

The initial packet may be a packet sent by other devices, or a packet generated by the originating network node.

At block S502, if it is determined that an unsecured network node exists in an SRv6 forwarding path for forwarding the initial packet, an argument for a security authentication instruction is obtained.

The security authentication instruction indicates that the unsecured network node performs the security authentication processing on the SRv6 packet.

Specifically, the security authentication instruction may include an encapsulation instruction and a decapsulation instruction.

Further, the unsecured network node may be a network node per se having data leakage risk or may be network nodes connected to an unsecured link having data leakage risk.

Specifically, the unsecured link may be an unsecured path segment having data leakage risk, and thus, the unsecured network nodes may be network nodes locating at the starting point and the ending point of the unsecured path segment.

For example, referring to FIG. 2, if the path segment R3-R5 of network nodes is the unsecured path segment, the unsecured network nodes may be the network node R3 and the network node R5.

In an example of the present disclosure, the originating network node may determine that the SRv6 forwarding path includes an unsecured network node through information indicating the unsecured network node. The information may be manually sent to the originating network node by an administrator, or may be sent to the originating network node by a central controller or control node except for the originating network node, or may be determined by the originating network node per se. The process of determining the unsecured network node by the originating network node belongs to a process performed by a controlling layer of the originating network node. This determining process and the packet forwarding process can be completed independently.

Specifically, the unsecured network node may be a preset network node. The unsecured network node may be determined as a network node with a larger number of occurrences of data leakage based on history forwarding information of network nodes in the SRv6 forwarding path.

In another example of the present disclosure, the argument for the security authentication instruction may be generated by the originating network node after determining the unsecured network node, or sent to the originating network node by the central controller or the control node, or manually sent to the originating network node by the administrator.

Further, performing the security authentication processing on the SRv6 packet may include two processes of encapsulating the SRv6 packet and decapsulating the SRv6 packet. Therefore, a pair of network nodes included in the SRv6 forwarding path are required for encapsulating the SRv6 packet and decapsulating the SRv6 packet, respectively. As a result, the unsecured network nodes may exist in pair in the SRv6 forwarding path. In the SRv6 forwarding path, the network node encapsulating the SRv6 packet is located before the network node decapsulating the SRv6 packet.

At block S503, it is determined whether a data amount of the argument for the security authentication instruction is greater than a maximum data amount of the arguments field in the SID.

Specifically, the total data amount of the SID in the SRv6 packet is preset as 128 bit, and the 128 bit data amount may be assigned to the Locator, the Function and the Arguments in advance. The maximum data amount of the arguments field is the data amount assigned to the Arguments.

If the data amount of the argument for the security authentication instruction is greater than that of the arguments field in the SID, then the argument for the security authentication instruction is hard to be completely stored in the arguments field, and thus a step S504 may be performed. If the data amount of the argument for the security authentication instruction is smaller than or equal to that of the arguments field in the SID, then the argument for the security authentication instruction can be completely stored in the arguments field, and thus a step S505 may be performed.

At block S504, for the unsecured network node, the SID having the function field that contains the security authentication instruction and the arguments field that contains a first argument is generated, and the SRv6 packet is generated based on the initial packet.

An extension field in the header of the SRv6 packet includes a second argument.

The security authentication instruction further indicates that the argument for the security authentication instruction are stored in the arguments field and the extension field in the header.

Since the argument for the security authentication instruction are respectively stored in the arguments field and the extension field, the security authentication instruction may indicate that the argument is stored in the arguments field and the extension field, so that the unsecured network node, after obtaining the security authentication instruction, may obtain the argument for the security authentication instruction from the arguments field and the extension field.

Further, the first argument is a part of the argument for the security authentication instruction with a data amount smaller than or equal to the maximum data amount, and the second argument is the other part of the argument for the security authentication instruction except for the first argument.

Specifically, since the data amount of the argument for the security authentication instruction is greater than the maximum data amount, the arguments field is hard to completely store the argument for the security authentication instruction. Therefore, the first argument in the argument for the security authentication instruction with a data amount smaller than or equal to the maximum data amount may be stored in the arguments field in the SID, and the second argument except for the first argument in the argument for the security authentication instruction, which is hard to be stored in the arguments field, is stored in the extension field of the header.

The first argument may be any data in the argument for the security authentication instruction with data amount smaller than or equal to the maximum data amount, or may be data composed of continuous bytes from the starting byte in the argument for the security authentication instruction with data amount smaller than or equal to the maximum data amount.

The second argument stored in the extension field may be data in the form of Type Length Value (TLV). The extension field records the second argument, an argument type corresponding to the second argument, a length of the second argument, and an identifier for the second argument.

Referring to the table 1, table 1 illustrates a data set in the form of TLV according to an example of the present disclosure.

TABLE 1

| Type | Length | Identifier |
|------|--------|------------|
| Second argument | | |

Type represents the argument type corresponding to the second argument, Length represents the length of the second argument, and Identifier represents the identifier for the second argument.

In an example of the present disclosure, the generated SID may be inserted into the segment list in the header of the initial packet based on the location of the unsecured network node in the SRv6 forwarding path to generate the SRv6 packet. Specifically, SIDs in the segment list are in the reverse order of the network nodes corresponding to the SIDs in the SRv6 forwarding path.

In another example of the present disclosure, an identifier for the encapsulation instruction may be END.SE. The instruction identified as END.SE is used for instructing the network node to encapsulate the SRv6 packet. An identifier for the decapsulation instruction may be END.SD. The instruction identified as END.SD is used for instructing the network node to decapsulate the SRv6 packet.

For example, the identifier END.SE may be contained in the function field in the generated SID corresponding to a first network node, so as to instruct the first network node to encapsulate the SRv6 packet. The identifier END.SD may be contained in the function field in the generated SID corresponding to a second network node, so as to instruct the second network node to decapsulate the SRv6 packet.

At block S505, for the unsecured network node, the SID having the function field that contains the security authentication instruction and the arguments field that contains the arguments for the security authentication instruction is generated, and the SRv6 packet is generated based on the initial packet.

The security authentication instruction further indicates that the argument for the security authentication instruction is stored in the arguments field.

Specifically, since the data amount of the argument for the security authentication instruction is smaller than or equal to the maximum data amount, the arguments field can completely store the argument for the security authentication instruction. Accordingly, the SID having a function field that includes the security authentication instruction and an arguments field that includes the argument for the security authentication instruction may be directly generated, and the generated SID is inserted into the segment list in the header of the initial packet to generate the SRv6 packet.

Further, the block S505 is similar with the block S504, which is not repeated in the example of the present disclosure.

It can be seen that, since the maximum data amount of the arguments field in the SID is limited, a part of the argument for the security authentication instruction corresponding to the unsecured network node may be stored in the arguments field, and the other part of the argument may be stored in the extension field included in the header of the SRv6 packet. Therefore, in most cases, even if the data amount of the security authentication instruction is greater than the maximum data amount of the arguments field, the security authentication instruction can still be completely stored in the SRv6 packet, and completely forwarded to the unsecured network node, so that the unsecured network node can obtain the complete argument for the security authentication instruction and perform the security authentication processing on the SRv6 packet based on the complete argument.

Figure 6:
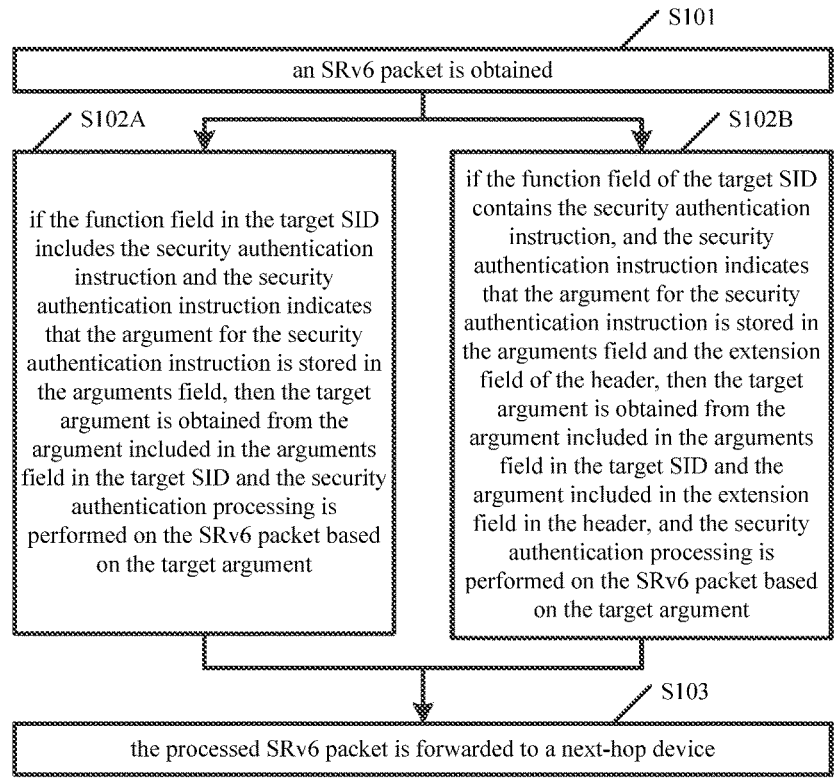
FIG. 6 is a flowchart of a second method for packet forwarding according to an example of the present disclosure.

FIG. 6 is a flowchart of a second method for packet forwarding according to an example of the present disclosure. Compared with the example in FIG. 1, the step S102 may include blocks S102A-S102B.

At S102A, if the function field in the target SID includes the security authentication instruction and the security authentication instruction indicates that the argument for the security authentication instruction is stored in the arguments field, then the target argument is obtained from the argument included in the arguments field in the target SID and the security authentication processing is performed on the SRv6 packet based on the target argument.

Since the security authentication instruction indicates that the argument for the security authentication instruction is stored in the arguments field in the target SID, the target argument can be obtained from the arguments field in the target SID.

Specifically, the arguments field is in a fixed location in the target SID and has a fixed data length, therefore the arguments field can be directly determined from the target SID, and then, the target argument is obtained from the arguments field.

Further, the performing of the security authentication processing on the SRv6 packet based on the target argument is similar with the example shown in the block S102, which is not repeated in the example of the present disclosure.

At block S102B, if the function field of the target SID contains the security authentication instruction, and the security authentication instruction indicates that the argument for the security authentication instruction is stored in the arguments field and the extension field of the header, then the target argument is obtained from the argument included in the arguments field in the target SID and the argument included in the extension field in the header, and the security authentication processing is performed on the SRv6 packet based on the target argument.

Since the security authentication instruction indicates that the argument for the security authentication instruction is stored in the arguments field in the target SID and the extension field of the SRv6 packet, the arguments can be obtained respectively from the argument included in the arguments field in the target SID and the argument included in the extension field, and the argument obtained from the arguments field and the argument obtained from the extension field are merged to obtain the target argument.

Further, the performing of the security authentication processing on the SRv6 packet based on the target argument is similar with the example shown in block S102, which is not repeated in the example of the present disclosure.

It can be seen that, the argument for the security authentication instruction corresponding to the network node may be completely stored in the arguments field. Alternatively, a part of the argument for the security authentication instruction may be stored in the arguments field and the other part of the argument for the security authentication instruction may be stored in the extension field included in the header of the SRv6 packet. The storage location of the argument may be determined based on the security authentication instruction, and the target argument is obtained from the storage location indicated by the security authentication instruction, so that the security authentication processing can be performed on the SRv6 packet based on the complete target argument.

Corresponding to the method for packet forwarding, an example of the present disclosure provides an apparatus for packet forwarding.

Figure 7:
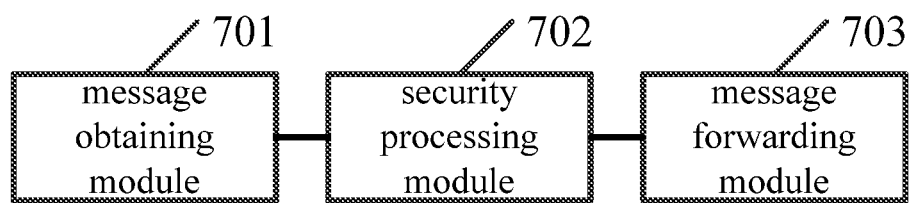
FIG. 7 is a structural diagram of an apparatus for packet forwarding according to an example of the present disclosure.

FIG. 7 is a structural diagram of an apparatus for packet forwarding according to an example of the present disclosure, which is applied to a network node, including:

a packet obtaining module 701 to obtain an SRv6 packet;

an security processing module 702 to, if a function field in a target segment identifier SID contains a security authentication instruction, obtain a target argument based on an operation indicated by the security authentication instruction, and perform security authentication processing on the SRv6 packet based on the target argument; wherein, the target SID is an SID, corresponding to the network node, in a segment list carried by a header of the SRv6 packet, and the target argument is an argument for the security authentication instruction recorded in the header; and a packet forwarding module 703 to forward the processed SRv6 packet to a next-hop device.

It can be seen that, in the case that the function field in the target SID corresponding to the network node contains the security authentication instruction, the network node does not directly forward the SRv6 packet, but the network node forwards, after performing security authentication processing indicated by the security authentication instruction on the SRV6 packet based on the target argument, the SRv6 packet on which the security authentication processing has been performed. Since the security of the SRv6 packet can be improved by performing, by the network node, the security authentication processing indicated by the security authentication instruction on the SRv6 packet, thus the security in forwarding the SRv6 packet can be improved by applying, by the network node, the technical solution of the example of the present disclosure to forward the SRv6 packet on which the security authentication processing has been performed.

In an example of the present disclosure, the SRv6 packet is generated by an originating network node for the SRv6 packet through operations of:

receiving an initial packet;

if it is determined that an unsecured network node exists in an SRv6 forwarding path for forwarding the initial packet, obtaining the argument for the security authentication instruction, wherein, the security authentication instruction indicates that the unsecured network node performs the security authentication processing on the SRv6 packet;

determining whether a data amount of the argument for the security authentication instruction is greater than a maximum data amount of an arguments field in the SID;

if the data amount of the argument for the security authentication instruction is greater than the maximum data amount of the arguments field in the SID, generating the SID having the function field that contains the security authentication instruction and the arguments field that contains a first argument for the unsecured network node, and generating the SRv6 packet based on the initial packet, wherein, an extension field in the header of the SRv6 packet contains a second argument, the security authentication instruction further indicates that the argument for the security authentication instruction is stored in the arguments field and the extension field in the header, the first argument is a part of the argument for the security authentication instruction with a data amount smaller than or equal to the maximum data amount, and the second argument is the other part of the argument for the security authentication instruction except for the first argument; and if the data amount of the argument for the security authentication instruction is not greater than the maximum data amount of the arguments field in the SID, generating the SID having the function field that contains the security authentication instruction and the arguments field that contains the argument for the security authentication instruction for the unsecured network node, and generating the SRv6 packet based on the initial packet, wherein, the security authentication instruction further indicates that the argument for the security authentication instruction is stored in the arguments field.

It can be seen, since the maximum data amount of the arguments field in the SID is limited, a part of the argument for the security authentication instruction corresponding to the unsecured network node may be stored in the arguments field, and the other part of the argument may be stored in the extension field in the header of the SRv6 packet. Therefore, in most cases, even if the data amount of the argument for the security authentication instruction is greater than the maximum data amount of the arguments field, the argument for the security authentication instruction can still be completely stored in the SRv6 packet, and completely forwarded to the unsecured network node, so that the unsecured network node can obtain the complete argument for the security authentication instruction and perform the security authentication processing on the SRv6 packet based on the complete argument.

In an example of the present disclosure, the security processing module 702 is further to:

obtain the target argument from the argument contained in the arguments field in the target SID, if the function field in the target SID contains the security authentication instruction, and the security authentication instruction indicates that the argument for the security authentication instruction is stored in the arguments field;

obtain the target argument from the argument contained in the arguments field in the target SID and the argument contained in the extension field in the header, if the function field in the target SID contains the security authentication instruction, and the security authentication instruction indicates that the argument for the security authentication instruction is stored in the arguments field and the extension field in the header; and perform the security authentication processing on the SRv6 packet based on the target argument.

It can be seen that the argument for the security authentication instruction corresponding to the network node may be completely stored in the arguments field. Alternatively, a part of the argument for the security authentication instruction may be stored in the arguments field and the other part of the argument for the security authentication instruction may be stored in the extension field included in the header of the SRv6 packet. The storage location of the argument may be determined based on the security authentication instruction, and the target argument is obtained from the storage location indicated by the security authentication instruction, so that the security authentication processing can be performed on the SRv6 packet based on the complete target argument.

In an example of the present disclosure, the security authentication instruction includes an encapsulation instruction for encapsulating a payload of the SRv6 packet.

The security processing module 702 is further to:

obtain the target argument based on the operation indicated by the security authentication instruction if the function field in the target SID contains the security authentication instruction; and encapsulate the payload of the SRv6 packet based on the target argument.

In an example of the present disclosure, the security authentication instruction includes a decapsulation instruction for decapsulating the payload of the SRv6 packet.

The security processing module 702 is further to:

obtain the target argument based on the operation indicated by the security authentication instruction if the function field in the target SID contains the security authentication instruction; and decapsulate the payload of the SRv6 packet based on the target argument.

Figure 8:
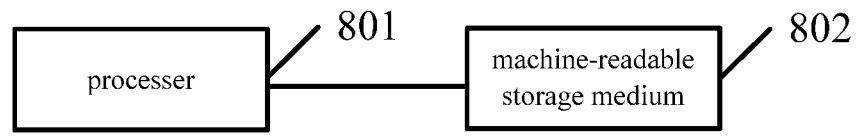
FIG. 8 is a structural diagram of a network node according to an example of the present disclosure.

An example of the present disclosure further provides a network node. As shown in FIG. 8, The network node includes a processer 801 and a machine-readable storage medium 802. The machine-readable storage medium 802 stores machine executable instructions that, upon executed by the processor 801, cause the processor 801 to carry out any one of the methods for packet forwarding.

In the process of forwarding a packet by the network node according to the example of the present disclosure, in the case that the function field in the target SID corresponding to the network node contains the security authentication instruction, the network node does not directly forward the SRv6 packet, but the network node forwards, after performing security authentication processing indicated by the security authentication instruction on the SRv6 packet based on the target argument, the SRv6 packet on which the security authentication processing has been performed. Since the security of the SRv6 packet can be improved by performing, by the network node, the security authentication processing indicated by the security authentication instruction on the SRv6 packet, thus the security in forwarding the SRv6 packet can be improved by applying, by the network node, the technical solution of the example of the present disclosure to forward the SRv6 packet on which the security authentication processing has been performed.

The machine-readable storage medium may include a Random Access Memory (RAM), or a Non-volatile Memory (NVM), for example, at least one magnetic disk memory. Optionally, the machine-readable storage medium may also be at least one storage device located away from the processor.

The processor may be a general-purpose processor, including a Central Processing Unit (CPU), a Network Processor (NP), etc.; it may also be a Digital Signal Processor (DSP), an Application Specific Integrated Circuit (ASIC), a Field-Programmable Gate Array (FPGA) or other programmable logic devices, discrete gates or transistor logic devices, discrete hardware components.

An example of the present disclosure further provides a computer-readable storage medium having stored thereon a computer program that, upon executed by a processor, causes the processor to carry out any one of the methods for packet forwarding applied to the network node.

In the process of forwarding a packet by executing the computer program stored on the computer-readable storage medium according to the example of the present disclosure, in the case that the function field in the target SID corresponding to the network node contains the security authentication instruction, the network node does not directly forward the SRv6 packet, but the network node forwards, after performing security authentication processing indicated by the security authentication instruction on the SRV6 packet based on the target argument, the SRv6 packet on which the security authentication processing has been performed. Since the security of the SRv6 packet can be improved by performing, by the network node, the security authentication processing indicated by the security authentication instruction on the SRv6 packet, thus the security in forwarding the SRv6 packet can be improved by applying, by the network node, the technical solution of the example of the present disclosure to forward the SRv6 packet on which the security authentication processing has been performed.

An example of the present disclosure further provides a computer program product including instructions that, when run on a computer, cause the computer to carry out any one of the methods for packet forwarding applied to the network node.

In the process of forwarding a packet by executing the computer program stored on the computer-readable storage medium according to the example of the present disclosure, in the case that the function field in the target SID corresponding to the network node contains the security authentication instruction, the network node does not directly forward the SRv6 packet, but the network node forwards, after performing security authentication processing indicated by the security authentication instruction on the SRV6 packet based on the target argument, the SRv6 packet on which the security authentication processing has been performed. Since the security of the SRv6 packet can be improved by performing, by the network node, the security authentication processing indicated by the security authentication instruction on the SRv6 packet, thus the security in forwarding the SRv6 packet can be improved by applying, by the network node, the technical solution of the example of the present disclosure to forward the SRv6 packet on which the security authentication processing has been performed.

Above examples may be fully or partially implemented in software, hardware, firmware, or any combination thereof. When implemented in software, all or part of the examples may be implemented in the form of a computer program product. The computer program product includes one or more computer instructions. When the computer program instructions are loaded and executed on a computer, the procedures or functions described in the examples of the present disclosure will take place in whole or in part. The computer may be a general-purpose computer, a special purpose computer, a computer network, or other programmable devices. The computer instructions may be stored in a computer-readable storage medium or transmitted from one computer-readable storage medium to another computer-readable storage medium. For example, the computer instructions may be transmitted from one website, computer, server, or data center to another website, computer, server, or data center via wired (e.g., coaxial cable, fiber optic, Digital Subscriber Line (DSL)) or wireless (e.g., infrared, wireless, microwave, etc.) means. The computer-readable storage medium may be any available medium that may be accessed by a computer or comprise a data storage device, such as a server, a data center and the like integrated from one or more available medias. The available media may be a magnetic media (e.g., floppy Disk, hard Disk, magnetic tape), an optical media (e.g., DVD), or a semiconductor media (e.g., Solid State Disk (SSD)) and the like.

It should be noted that the relationship terms used here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " and "include(s) a/an . . . " do not exclude additional identical elements in the processes, methods, articles, or devices, including the listed elements.

Various examples in this specification are described in a related manner, and the same or similar parts between the various examples may be referred to each other. Each example focuses on the differences from other examples. In particular, as for examples of apparatus, electronic device, computer-readable storage medium and computer program product, since they are basically similar to the method example, the description is relatively simple, and the relevant part may refer to the description of the method example.

The above examples are merely preferred examples of the present disclosure, and are not intended to limit the protection scope of the present disclosure. Any modification, equivalent replacement, and improvement made within the spirit and principle of this disclosure fall within the protection scope of this disclosure.

What is claimed is:

1. A method for packet forwarding, which is applied to a network node, comprising:
   obtaining an SRv6 packet;
   if a function field in a target segment identifier SID contains a security authentication instruction, obtaining a target argument based on an operation indicated by the security authentication instruction, and performing security authentication processing on the SRv6 packet based on the target argument; wherein, the target SID is an SID, corresponding to the network node, in a segment list carried by a header of the SRv6 packet, and the target argument is an argument for the security authentication instruction recorded in the header;
   forwarding the processed SRv6 packet to a next-hop device;
   wherein the obtained SRv6 packet is generated by an originating network node for the SRv6 packet through operations of:
   receiving an initial packet;
   if it is determined that an unsecured network node exists in an SRv6 forwarding path for forwarding the initial packet, obtaining the argument for the security authentication instruction, wherein, the security authentication instruction indicates that the unsecured network node performs the security authentication processing on the SRv6 packet;
   determining whether a data amount of the argument for the security authentication instruction is greater than a maximum data amount of an arguments field in the SID;
   if the data amount of the argument for the security authentication instruction is greater than the maximum data amount of the arguments field in the SID, generating the SID having the function field that contains the security authentication instruction and the arguments field that contains a first argument for the unsecured network node, and generating the SRv6 packet based on the initial packet, wherein, an extension field in the header of the SRv6 packet contains a second argument, the security authentication instruction further indicates that the argument for the security authentication instruction is stored in the arguments field and the extension field in the header, the first argument is a part of the argument for the security authentication instruction with a data amount smaller than or equal to the maximum data amount, and the second argument is the other part of the argument for the security authentication instruction except for the first argument; and if the data amount of the argument for the security authentication instruction is not greater than the maximum data amount of the arguments field in the SID, generating the SID having the function field that contains the security authentication instruction and the arguments field that contains the argument for the security authentication instruction for the unsecured network node, and generating the SRv6 packet based on the initial packet, wherein, the security authentication instruction further indicates that the argument for the security authentication instruction is stored in the arguments field.

2. The method according to claim 1, wherein, obtaining the target argument based on the operation indicated by the security authentication instruction comprises:

obtaining the target argument from the argument contained in the arguments field in the target SID, if the security authentication instruction indicates that the argument for the security authentication instruction is stored in the arguments field; and obtaining the target argument from the argument contained in the arguments field in the target SID and the argument contained in the extension field in the header, if the security authentication instruction indicates that the argument for the security authentication instruction is stored in the arguments field and the extension field in the header.

3. The method according to claim 1, wherein, the security authentication instruction comprises an encapsulation instruction for encapsulating a payload of the SRv6 packet; and performing the security authentication processing on the SRv6 packet based on the target argument comprises:
encapsulating the payload of the SRv6 packet based on the target argument.

4. The method according to claim 1, wherein, the security authentication instruction comprises a decapsulation instruction for decapsulating the payload of the SRv6 packet; and performing the security authentication processing on the SRv6 packet based on the target argument comprises:
decapsulating the payload of the SRv6 packet based on the target argument.

5. An apparatus for packet forwarding, which is applied to a network node, comprising:

a packet obtaining module to obtain an SRv6 packet;
a security processing module to, if a function field in a target segment identifier SID contains a security authentication instruction, obtain a target argument based on an operation indicated by the security authentication instruction, and perform security authentication processing on the SRv6 packet based on the target argument; wherein, the target SID is an SID, corresponding to the network node, in a segment list carried by a header of the SRv6 packet, and the target argument is an argument for the security authentication instruction recorded in the header; and
a packet forwarding module to forward the processed SRv6 packet to a next-hop device;

wherein, the obtained SRv6 packet is generated by an originating network node for the SRv6 packet through operations of:
receiving an initial packet;
if it is determined that an unsecured network node exists in an SRv6 forwarding path for forwarding the initial packet, obtaining the argument for the security authentication instruction, wherein, the security authentication instruction indicates that the unsecured network node performs the security authentication processing on the SRv6 packet;
determining whether a data amount of the argument for the security authentication instruction is greater than a maximum data amount of an arguments field in the SID;
if the data amount of the argument for the security authentication instruction is greater than the maximum data amount of the arguments field in the SID, generating the SID having the function field that contains the security authentication instruction and the arguments field that contains a first argument for the unsecured network node, and generating the SRv6 packet based on the initial packet, wherein, an extension field in the header of the SRv6 packet contains a second argument, the security authentication instruction further indicates that the argument for the security authentication instruction is stored in the arguments field and the extension field in the header, the first argument is a part of the argument for the security authentication instruction with a data amount smaller than or equal to the maximum data amount, and the second argument is the other part of the argument for the security authentication instruction except for the first argument; and
if the data amount of the argument for the security authentication instruction is not greater than the maximum data amount of the arguments field in the SID, generating the SID having the function field that contains the security authentication instruction and the arguments field that contains the argument for the security authentication instruction for the unsecured network node, and generating the SRv6 packet based on the initial packet, wherein, the security authentication instruction further indicates that the argument for the security authentication instruction is stored in the arguments field.

6. The apparatus according to claim 5, wherein, the security processing module is further to:

obtain the target argument from the argument contained in the arguments field in the target SID, if the function field in the target SID contains the security authentication instruction, and the security authentication instruction indicates that the argument for the security authentication instruction is stored in the arguments field;

obtain the target argument from the argument contained in the arguments field in the target SID and the argument contained in the extension field in the header, if the function field in the target SID contains the security authentication instruction, and the security authentication instruction indicates that the argument for the security authentication instruction is stored in the arguments field and the extension field in the header; and perform the security authentication processing on the SRv6 packet based on the target argument.

7. The apparatus according to claim 5, wherein, the security authentication instruction comprises an encapsulation instruction for encapsulating a payload of the SRv6 packet; and the security processing module is further to:
obtain the target argument based on the operation indicated by the security authentication instruction if the function field in the target SID contains the security authentication instruction; and
encapsulate the payload of the SRv6 packet based on the target argument.

8. The apparatus according to claim 5, wherein, the security authentication instruction comprises a decapsulation instruction for decapsulating the payload of the SRv6 packet;

the security processing module is further to:
obtain the target argument based on the operation indicated by the security authentication instruction if the function field in the target SID contains the security authentication instruction; and
decapsulate the payload of the SRv6 packet based on the target argument.

9. A network node, comprising a processor and a machine-readable storage medium, the machine-readable storage medium has stored thereon machine executable instructions that, upon executed by the processor, cause the processor to carry out the method according to claim 1.

10. A non-transitory machine-readable storage medium having stored thereon machine executable instructions that, upon called and executed by a processor, cause the processor to carry out the method according to claim 1.

* * * * *

UNITED STATES PATENT AND TRADEMARK OFFICE
CERTIFICATE OF CORRECTION

| | | |
|---|---|---|
| PATENT NO. | : 12,413,510 B2 | Page 1 of 1 |
| APPLICATION NO. | : 18/001943 | |
| DATED | : September 9, 2025 | |
| INVENTOR(S) | : Chang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 390 days.

Signed and Sealed this
Sixteenth Day of December, 2025

John A. Squires
*Director of the United States Patent and Trademark Office*